United States Patent [19]

Hammer

[11] 4,151,588
[45] Apr. 24, 1979

[54] METHOD AND APPARATUS FOR CONTROLLING ONE OR SEVERAL VARIABLES DEPENDING ON SEVERAL CONTROL INPUTS

[75] Inventor: Hansjörg Hammer, Erlangen, Fed. Rep. of Germany

[73] Assignee: Siemens Aktiengesellschaft, Munich, Fed. Rep. of Germany

[21] Appl. No.: 824,833

[22] Filed: Aug. 15, 1977

[30] Foreign Application Priority Data

Aug. 20, 1976 [DE] Fed. Rep. of Germany ....... 2637620

[51] Int. Cl.² .................. G05B 13/02; G05B 17/02
[52] U.S. Cl. ................................. 364/106; 241/33;
  364/105; 364/469; 364/502
[58] Field of Search ............. 364/100, 105, 106, 117,
  364/469, 477, 502, 503; 241/33, 34

[56] References Cited

U.S. PATENT DOCUMENTS

| 3,480,765 | 11/1969 | Rouxel et al. | 364/105 |
| 3,880,348 | 4/1975 | Salihbegovic et al. | 364/105 |
| 3,920,965 | 11/1975 | Sohrwardy | 364/106 |
| 3,996,452 | 12/1976 | Schulze et al. | 364/105 |

Primary Examiner—Felix D. Gruber
Attorney, Agent, or Firm—Kenyon & Kenyon, Reilly, Carr & Chapin

[57] ABSTRACT

In order to control a variable of a control system depending on a plurality of control inputs to minimize an error function, one control input at a time is, at regular intervals, varied step by step in the same direction until the sign of the differential quotient with respect to time of the absolute value of the error between a predetermined desired value and the actual value of the variable has changed from minus to plus, whereupon the same control input is varied in steps in the opposite direction, with the remaining control inputs varied in the same manner cyclically and sequentially after a respective predetermined number of such sign reversals.

4 Claims, 7 Drawing Figures

METHOD AND APPARATUS FOR CONTROLLING ONE OR SEVERAL VARIABLES DEPENDING ON SEVERAL CONTROL INPUTS

BACKGROUND OF THE INVENTION

This invention relates to a method for controlling one or more variables depending on several control inputs in order to minimize an error function in general and more particularly to an improved method of this type which is well adapted for controlling the mixture in a raw material mill in the manufacture of cement.

A method of this general nature is known from the German journal "Regelungstechnik und Prozess-Datenverarbeitung" 1972, No. 5, pages 190 to 198. It is proposed there to apply the minimizing method of Zangwill (Computer Journal, Vol. 10, No. 4, pages 67 and 68) and to implement it with a process computer because of the large mathematical effort required.

SUMMARY OF THE INVENTION

It is an object of the present invention to provide a control method of the kind mentioned above, which requires less mathematical effort, does not neccessitate a process computer or, if a computer is used, can run substantially faster. According to the present invention, this problem is solved by always varying one of the control inputs at regular time intervals in steps in the same direction until the sign of the differential quotient with respect to time of the absolute value of the error to be minimized between a predeterminable target value and the actual value of the controlled variable has changed from minus to plus; thereupon effecting a stepwise change of the same control input in the opposite direction; and varying the remaining control inputs in the same manner cyclically and sequentially after a predetermined number of such sign changes.

A simple possibility of carrying out this method in practice is obtained by the following features:

(a) the counting inputs of bidirectional digital counters, the output signals of which form the control inputs, are connected cyclically and sequentially to the output of a clock generator in dependence on the output signals of a circulating shift register, (b) the absolute value, differentiated with respect to time, of the difference between a predeterminable target value and the actual value of the controlled variable is fed to a zero crossover detector the output of which is connected to the counting input of a counter which operates repetitively from zero to a given value and can thereafter be reset, and to the input of a bistable multivibrator, e.g., flip flop, (c) the inputs determining the counting direction of the bidirectional digital counter are connected to the outputs of the bistable multivibrator, and (d) the shift register is advanced by the reset pulses of the repetitively operating counter.

DETAILED DESCRIPTION OF THE INVENTION

Figure 1:
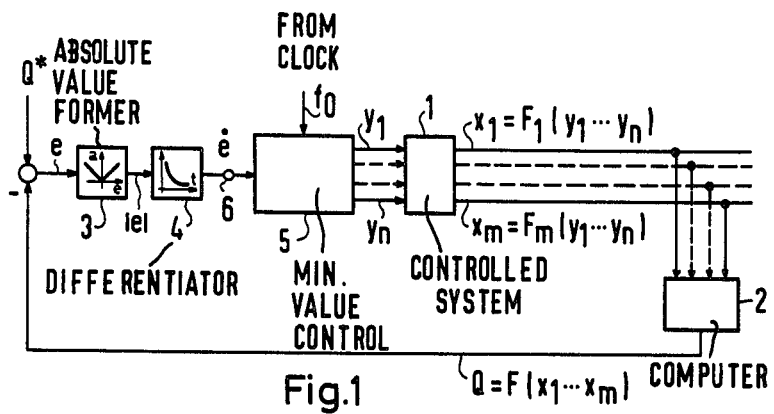
FIG. 1 is a block diagram of the system of the present invention.

In the general block diagram of FIG. 1, a controlled system is acted upon by n control inputs $y_1$ to $y_n$. The m output variables of the controlled system are designated with $x_1$ to $x_m$, where the latter may be any functions $F_1$ to $F_m$ of the control inputs $y_1$ to $y_n$. From the output variables $x_1$ to $x_m$, the actual value of the controlled quantity Q is determined by means of a computer 2; Q is in turn a function F of the output variables $x_1$ to $x_m$. It is the control objective to approximate the quantity $Q^*$ optimally to a predeterminable target value Q by suitable choice of the control inputs $y_1$ to $y_n$. For this purpose, the deviation e between the target value $Q^*$ and the actual value Q is fed to an absolute value former 3, the output signal of which is fed to the differentiator 4. The output signal ė of the differentiator 4, which corresponds to the absolute value, differentiated with respect to time, of the error deviation e between the target value and the actual value of the controlled quantity, acts on a miminum value control 5. The control 5 continuously changes its output variables, the control inputs $y_1$ to $y_n$, in such a manner that at first an arbitrary one of these control inputs is varied in steps at regular time intervals determined by the clock frequency $f_0$ fed to the minimum value control, in the same direction until the polarity of the signal ė present at the input terminal 6 of the minimum value control 5 has changed from minus to plus. Then, the direction of the control step changes of the control input is reversed and the latter is varied in steps until again such a change of polarity has occurred. This cycle is continued with the same control input until a given number of polarity changes has occurred, whereupon the next control input is varied in the same manner. It is possible in this manner to automatically find and retain the smallest possible deviation e from the predetermined target value $Q^*$.

Figure 2:
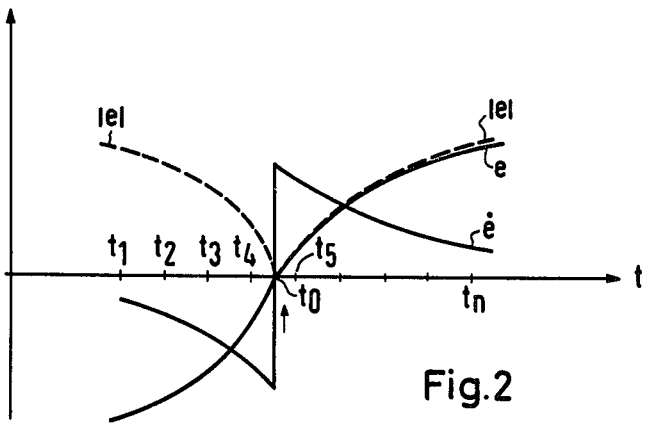
FIG. 2 is a plot of various functions computed by the system of FIG. 1 for the case where the error passes through zero.

FIG. 2 serves to explain the principle of the method according to the invention. Let us assume that if a control input is changed in steps at the times $t_1$ to $t_n$ in one direction, the error, i.e., the deviation of the controlled quantity Q from the predetermined target value $Q^*$ has the shape designated e and becomes zero at the time $t_0$. The absolute value of the error then has the shape described by the curve $|e|$ and the derivative of the absolute value of the error with respect to time by the curve ė. We then have $ė = d|e|/dt$. As long as the function ė has negative polarity, the direction of variation of the control input is chosen correctly, i.e., the movement is in the direction toward the minimum, while from the instant on when the sign of the function ė changes from minus to plus, the originally chosen direction of variation would lead away from the error minimum. Therefore, the direction of variation is reversed after a change of sign from minus to plus, so that the movement is again in the direction toward a decrease of the error. If, with this changed direction of the variation, the error minimum is again traversed, then the sign of the function ė will change again from minus to plus and a new reversal of the direction of variation is caused thereby.

Therefore, a continuous oscillation about the error minimum, i.e., about the predetermined target value, takes place. Nothing is changed in the manner of the operation described if the error function e tends from positive to negative values toward the error minimum with the originally assumed direction of variation.

Figure 3:
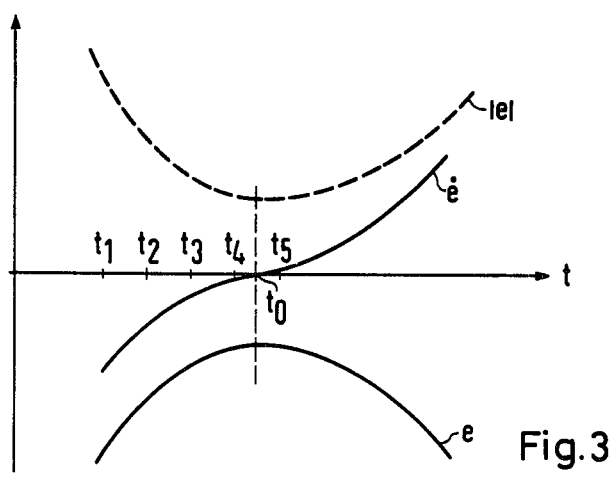
FIG. 3 is a similar diagram for the case where the error does not pass through zero.

In control systems with several control input variables, it will usually not be possible at all, due to mutual coupling, for the error function e to reach the value zero. The diagram of FIG. 3 is based on this case. Again, the error function is designated as e, the absolute value of the error as $|e|$ and the derivative with respect to time of the absolute value of the error as $\dot{e}$. Here, too, the direction of movement is correct if the polarity of the function $\dot{e}$ is negative, and the change of its sign from negative to positive polarity is a criterion that the minimum was traversed, and can be used for reversing the direction of the change steps. In the example shown, this occurs after the advancement step taking place at the time $t_4$. At the time $t_5$, the direction of adjustment is therefore reversed and this direction is retained until the minimum is traversed again, which then again causes a reversal of the direction of shift. Nothing is changed in this basic procedure if a function e is assumed as the error function which is mirrored at the t-axis. In this case, while the function e and the function $|e|$ should coincide, the function $\dot{e}$ remains unchanged, as does the strategy of the method according to the invention.

Figure 4:
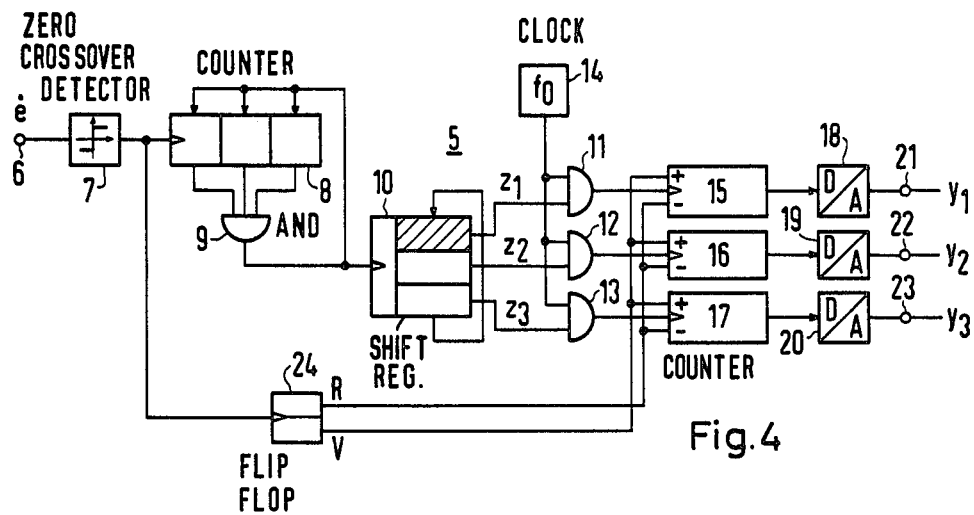
FIG. 4 is a block diagram of the minimum value control of FIG. 1.

FIG. 4 shows an example for a simple implementation of the minimum value control 5 of FIG. 1 with three output variables $y_1$ to $y_3$. A voltage which is proportional to the derivatives $\dot{e}$ with respect to time of the absolute value of the error to be minimized is fed to its input terminal 6. A zero crossover detector 7 is used to reliably detect the change of sign, which is important particularly in the case shown in FIG. 3. The output of the detector 7 is connected to the counting input of a 3 bit counter 8, the counting stage outputs of which are connected to the inputs of an AND gate 9. The output of the detector 7 is further connected to the dynamic input of a flipflop 24. The output signal of the AND gate 9, on the one hand, resets the count of the counter 8 to the value zero and, on the other hand, advances a circulating shift register 10. Of the three stages of the shift register 10, only one carries an "1" signal at any one time; at the moment considered, let this be the stage marked by shading. If the output signal of the detector 7 changes from negative to positive polarity, then a rising pulse edge is generated which causes the flipflop 24 to change its state and counter 8 to advance. After eight such changes counter 8 is full and AND gate 9 enabled to cause the shift register stage which just then carries "1" signal, to pass this "1" signal on to the adjacent stage and to thereupon resume a "0" signal itself. If after two such signal shifts of the "1" signal, the shift register stage shown at the bottom in FIG. 4 carries a "1" signal, then the next such shift will cause the "1" signal, because of the feedback of the shift register 10, to thereupon appear again at the top shift register stage, while the others have a "0" signal.

The outputs $z_1$ to $z_3$ of the shift register stages are respectively connected to one input of AND gates 11, 12 and 13, to the other inputs of which the output of a clock generator 14 is connected. That output $z_1$, $z_2$ or $z_3$ which happens to carry "1" signal, therefore always enables the AND gate associated with it to pass the clock pulses generated by the clock generator, which then get to the counting input of one of the bidirectional counters 15, 16 or 17. The counter content of each of these bidirectional counters is converted by respective digital to analog converters 18, 19 and 20 associated with them into corresponding analog voltages $y_1$ to $y_3$, which then appear at the output terminals 21, 22 and 23 as control inputs. The counting direction of the counters 15 to 17 is determined in each case by which of the two outputs designated as R and V of the bistable flipflop 24 carries a "1" signal. If, for instance, the output V has a "1" signal, then the count of the bidirectional counter driven by the pulses of the clock generator 14 would be increased, while it would be decreased, on the other hand, if the output R of the flipflop 24 carries a "1" signal.

The operation of the arrangement shown in FIG. 4 is as follows: Let it be assumed that at the instant considered, the input signal at the terminal 6 is of negative polarity and the output designated V of the bistable flipflop 24 as well as the output $z_1$ of the shift register 10 carry "1" signals. The gate 11 is therefore enabled for the pulses of the clock generator 14 and the count of the counter 15 is increasing. The control input $y_1$ is now continuously increased in steps until the input signal present at the terminal 6 changes its sign which, as explained before, serves as a criterion of traversing the error minimum. This change of polarity from negative to positive causes a rising edge at the output of detector 7 and the count of the counter 8 is increased by one unit and the flipflop 24 is put in the position where its output R has a "1" signal. Thereupon, the counting direction of the counter 15 is reversed and the control input $y_1$ is now decreased in steps. Because of this reversal of the stepping direction, the movement is again toward the minimum and the output signal of the detector 7 will change its sign from plus to minus. This polarity reversal, however, causes neither a change of the count of the counter 8 nor a change of the state of the flipflop 24, since these elements react only to rising pulse edges. The control input $y_1$ is now decreased in steps until the minimum is again traversed and the output signal of the detector 7 changes from negative to positive polarity. Thereby the count of the counter 8 is again increased by one unit and the flipflop 24 is flipped into that state in which the output V carries a "1" signal, and the bidirectional counter 15 is advanced by the pulses of the clock generator 14 in the positive direction, i.e., increasing its count. This cycle is repeated until the minimum has been traversed eight times and therefore, all the counting stages of the counter 8 carry "1" signals. Then, a "1" signal appears at the output of the AND gate 9, which resets the counter 8 to the value zero and advances the shift register, so that now the output $z_2$ of the shift register 10 carries a "1" signal and enables the AND gate 12 associated with it for the pulses of the clock generator 14 which then change the content of the bidirectional counter 16 in the appropriate manner. Then, the control input $y_2$ is changed in steps in an analogous manner in the one or the other direction until again the minimum has been traversed eight times, whereupon then the third control input $y_3$, and then again the control input $y_1$ is changed, and so forth.

Figure 5:
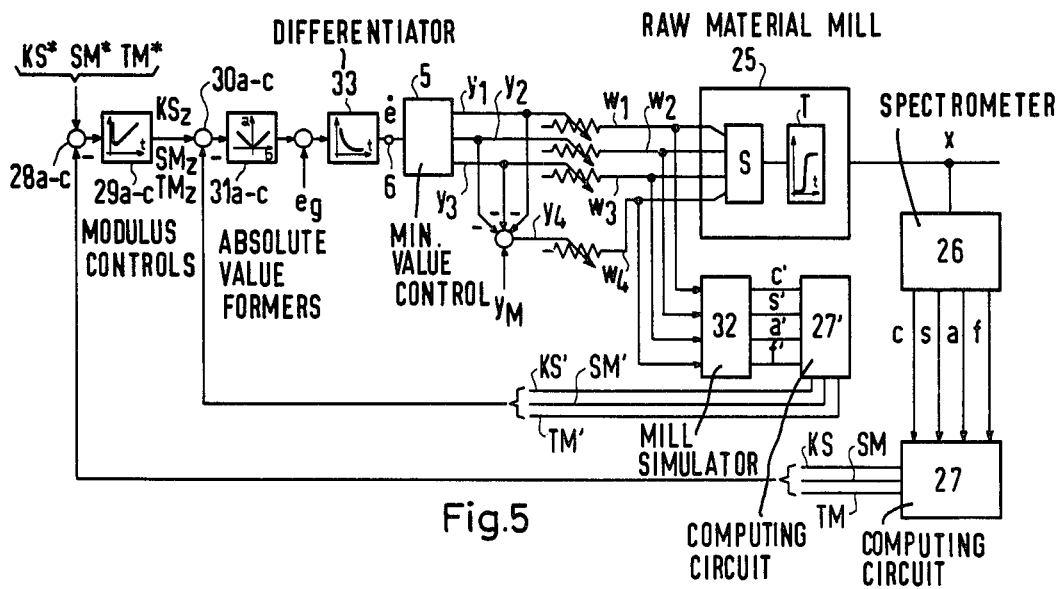
FIG. 5 is a block diagram of the present invention as used in a cement mill.

FIG. 5 shows the example of an application of the invention in the mixture control of a raw material mill in cement manufacturing. Four raw material components, for instance, marl ($w_1$), lime ($w_2$), clay ($w_3$) and sand ($w_4$) of different chemical composition are to be dosed so that the raw material mixture which consists of these components and is fed to the raw material mill 25 meets certain quality criteria regarding quantity and quality. As such criteria serve the so called lime standard KS, the silicate modulus SM and the clay modulus TM. These are calculated from the concentrations c, s, a and f of the oxides CaO, SiO$_2$, Al$_2$O$_3$ and Fe$_2$O$_3$, obtained by analysis of the raw powder mixture x by means of a spectrometer 26, in accordance with the following relations:

$$KS = \frac{100c}{2,8s + 1,1a + 0,7f} \tag{1}$$

$$SM = \frac{s}{1 + f} \tag{2}$$

$$TM = \frac{a}{f} \tag{3}$$

in a computing circuit 27. The actual values of the quality numbers KS, SM and TM are each fed to a mixer e.g., summing junctions 28a to 28c and compared there with corresponding desired values KS*, SM* and TM*. The outputs of the mixers 28a to 28c are connected to the inputs of three modulus controls designated as 29a to 29c, which are matched to the dynamic behavior of the mill and the output quantities of which form the target values KS$_z$, SM$_z$ and TM$_z$ for the minimum value control 5 subordinated to them. In three further summing junctions 30a to 30c, the difference between the target values KS$_z$, SM$_z$ and TM$_z$ and the quantities KS', SM' and TM' are formed. These latter quantities are simulations of the quality numbers KS, SM and TM and are taken off at the output of a computing circuit 27', the structure of which, to be explained in detail later, corresponds to the computing circuit 27 and has as inputs the quantities c', s' a' and f'. These are taken from a partial simulator 32 of the mill 25, which, like the mill 25, has as inputs four quantities which are proportional to the quantity percentages w$_1$ to w$_4$ of the raw material components. For modeling purposes, the mill can be split into a static, time invariant part S and a part T which determines its behavior in time. Block 32 represents a simulation of the static part of the controlled system 25 and supplies the values of the output variable in the steady state condition as a function of the control inputs. The block 32 can therefore be viewed as a fast model of the controlled system 25, since those variables, which would be available at the output of the spectrometer 26 only after a time determined by the time behavior of the mill and the evaluation apparatus 27, appear in its output immediately.

In three absolute value formers 31a to 31c, the absolute values of the output variables of the mixers 30a to 30c associated with them are formed. These values are added and, increased by an error limit signal e$_g$, fed to a differentiator 33. The output voltage ė of the differentiator 33 is fed to the input terminal 6 of the minimum value control 5, the design of which corresponds to the arrangement shown in FIG. 4. To make available the fourth quantity percentage w$_4$, a further auxiliary quantity y$_4$ is provided which is obtained from the difference between a constant value y$_m$ and the sum of the other three control inputs y$_1$, y$_2$ and y$_3$. In this manner it is ensured that the mill 25 is always charged with a constant quantity y$_m$ of raw material. The quantities y$_1$ to y$_4$ are coupled to the mill through adjustment potentiometers.

Figure 6:
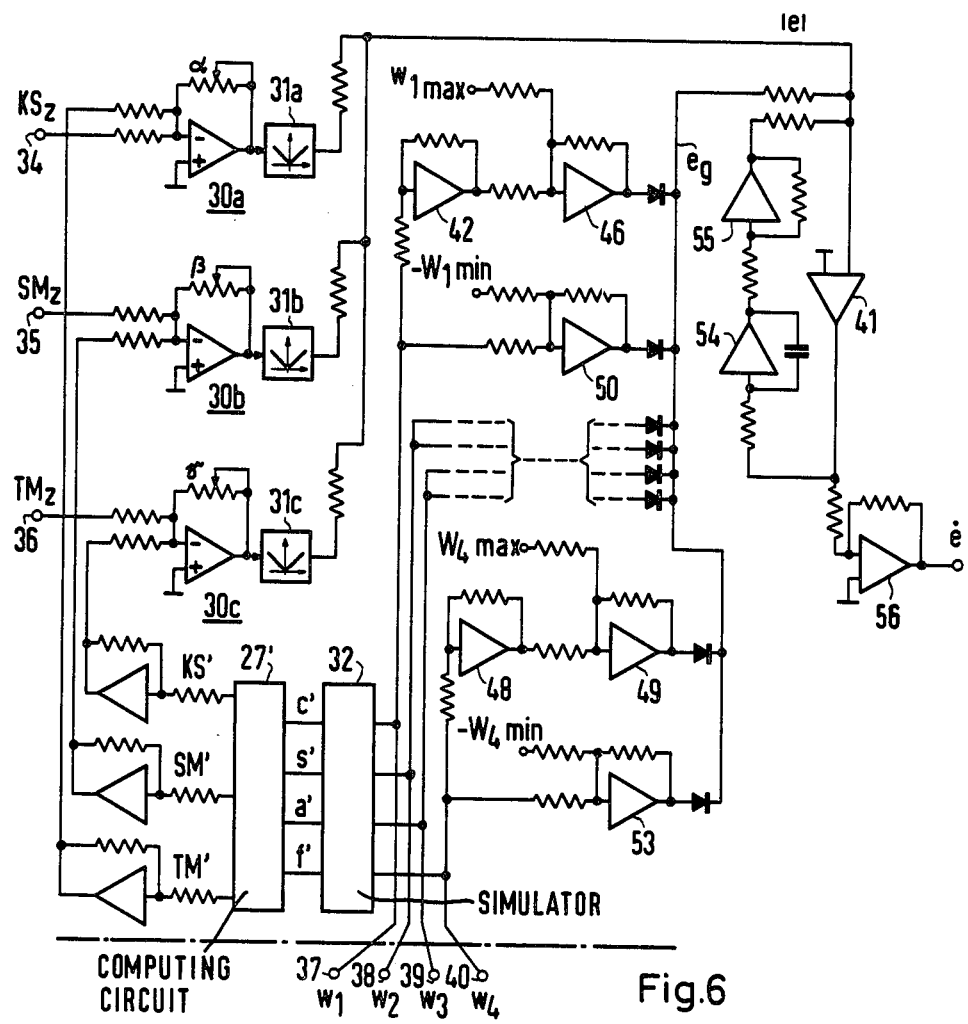
FIG. 6 is a circuit diagram of a portion of the system of FIG. 5.

FIG. 6 shows in detail the circuit for determining the function ė for the application example shown in FIG. 5. To the input terminals 34 to 36, voltages proportional to the target values of the quality numbers for the lime standard KS$_z$, the silicate modulus SM$_z$ and the clay modulus TM$_z$ are connected, which are supplied by the modulus controls 29a to 29c. In the summing amplifiers 30a to 30c, the difference between these quality number target values and the quality numbers KS', SM' and TM' simulated by the mill model 32 is formed. The negative feedback resistors of the summing amplifiers 30a to 30c are potentiometers, so that it is possible to weigh the differences between the individual target values with different factors α, β and γ. The output voltages of the summing amplifiers 30a to 30c drive, via absolute value formers 31a to 31c, an amplifier 41. As a further error component, the voltage e$_g$ is fed to the amplifier 41. Starting from the value zero, this voltage is to assume a positive value in a step in those cases where one of the quantity percentages w$_1$ to w$_4$ exceeds or falls below definite, perdeterminable values. In such cases, a sudden increase of the error function in the positive direction is to be simulated and thereby a reversal of the stepwise changing direction brought about. Therefore, the voltages which are present at the input terminals 37 to 40, and are proportional to the individual quantity percentages w$_1$ to w$_4$, are fed via inverting amplifiers such as the amplifiers 42 and which are coupled to the terminals 37 and 40 respectively, to summing amplifiers such as the amplifiers 46 and 49, to the other inputs of which a voltage is respectively applied which corresponds to the maximally permissible value of the corresponding quantity percentage (w$_{1max}$ to w$_{4max}$). The outputs of the amplifiers 46 and 49 along with the output of other amplifiers not shown in detail, but which would be in circuits identical to those shown and associated with the terminal 38 and 39, are connected via diodes to an input resistor of the amplifier 41. Similarly, the difference between the respective quantity percentage and its permissible minimum value (w$_{1min}$ to w$_{4min}$) is formed by means of summing amplifiers such as amplifiers 50 and 53 and fed via diodes to the amplifier 41. This amplifier has a high open circuit gain and is negatively fed back via an integrator 54 followed by an inverting amplifier 55. A further inverting amplifier 56 serves to reverse the polarity of the output signal of the amplifier 41, so that a voltage ė with the correct sign which is proportional to the derivative with respect to time of the absolute value of the error function e appears at the output of the inverting amplifier 56.

Of course, an equivalent mode of operation is obtained for the minimum value control with the circuit shown in FIG. 6, if the output voltage of the amplifier 41 is connected directly to the input terminal 6 of the minimum value control 5 and the dynamic inputs of the counter 8 as well as the bistable flipflop 24 are designed so that they respond only to falling pulse flanks.

Figure 7:
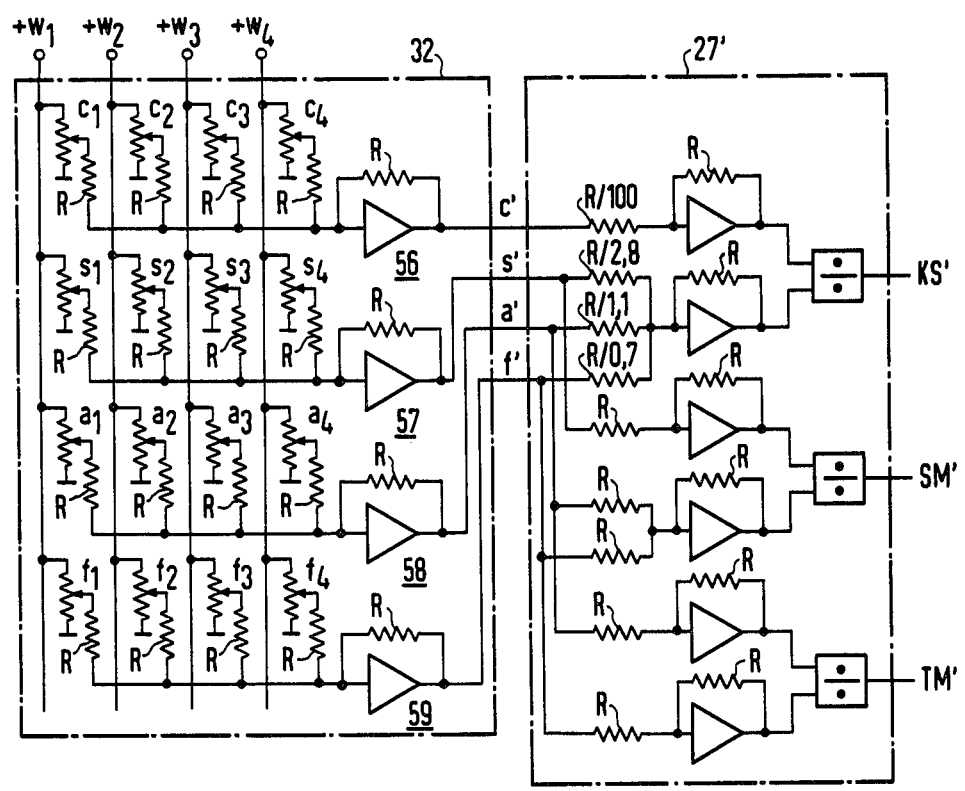
FIG. 7 is a circuit diagram of the computing circuit and mill simulator of FIG. 5.

FIG. 7 shows an embodiment of the simulating network 32 of the static part of the mill 25, i.e., a device which allows simulating the oxide concentrations c', s', a' and f' of the raw powder mixture to be produced later from the four voltages proportional to the individual quantity percentages w$_1$ to w$_4$. In addition, the design of the computing circuit 27' by means of which the quality numbers KS', SM' and TM' are calculated from the simulated oxide concentrations is shown. In the simulation circuit 32, four summing amplifiers 57 to 60 are provided, the inputs of which are connected via respective, equal input resistors R to the taps of potentiometers which are supplied with voltages proportional to the individual quantity percentages w$_1$ to w$_4$. The potentiometer taps are set in accordance with the known relative oxide concentrations of the individual quantity percentages. As will be seen, the output voltages of the amplifiers 57 to 60 are obtained according to the following equations:

$$c' = c_1w_1 + c_2w_2 + c_3w_3 + c_4w_4$$

$$s' = s_1w_1 + s_2w_2 + s_3w_3 + s_4w_4$$

$$a' = a_1w_1 + a_2w_2 + a_3w_3 + a_4w_4$$

$$f' = f_1w_1 + f_2w_2 + f_3w_3 + f_4w_4$$

From the quantities $c'$, $s'$, $a'$ and $f'$, the quality numbers KS', TM' and SM' are formed in accordance with the equations (1) to (3) given above, as can likewise be seen from the structure of the computing circuit shown in FIG. 7.

What is claimed is:

1. Apparatus for controlling at least one variable in dependence on a plurality of control inputs to minimize an error function comprising:
    (a) a plurality of bi-directional digital counters, the output signals of which form the control inputs;
    (b) a clock generator;
    (c) a circulating shift register;
    (d) means to sequentially and cyclically couple the output of said clock generator to the count inputs of said bi-directional digital counters in dependence on the output signals of said circulating shift register;
    (e) means for forming the absolute value of the difference between a predetermined target value and the actual value of the control quantity;
    (f) a differentiator having the output of said means for forming as an input the output;
    (g) a zero crossover detector having the output of said differentiator as an input;
    (h) a counter which operates repetitively from zero to a definite value having the output of said detector as an input;
    (i) means to reset said counter and to advance said shift register upon reaching said definite value; and
    (j) a flipflop having the output of said detector as a trigger input, the output of said flipflop coupled to the inputs of said bi-directional digital counters determining the direction of counting.

2. A method for controlling at least one variable of a controlled system in dependence on a plurality of control inputs to the controlled system to minimize an error function, comprising automatically carrying out the steps of:
    (a) developing an error signal, in summing means, which is the difference between the actual value of said at least one variable and a desired value of said at least one variable;
    (b) finding the absolute value of said error in absolute value forming means;
    (c) differentiating the absolute value so found to obtain a differential with respect to time in differentiating means;
    (d) always varying one of the control inputs to the control system in steps at regular time intervals in the same direction until the sign of said differential with respect to time has changed from minus to plus using minimum value control means;
    (e) thereupon varying the same control input in steps in the opposite direction using said minimum value control means;
    (f) repeating said steps of varying in one direction and the other using said minimum value control means; and
    (g) varying the remaining control inputs using said minimum value control means in the same manner cyclicly and sequentially after a respective predetermined number of said sign reversal, using said minimum value control means.

3. The method according to claim 2 and further including the step of finding the difference between said error signal and a pre-determined limit value in additional summing means prior to finding said absolute value.

4. In a raw material mill, a method of controlling at least one variable in dependence on a plurality of control inputs to the mill to minimize an error function comprising the steps of:
    (a) automatically simulating actual values of said variable using a fast mill model simulator having the control inputs to the mill as its inputs;
    (b) determining in first summing means a first set of error signals which are the difference between desired values of said variable and actual values of said variables;
    (c) deriving, from said first set of error signals, target values of said variables and superimposed modulus controls;
    (d) comparing said simulated actual-values with said target values in second summing means to obtain a second set of error signals;
    (e) determining the absolute value of said second set of error signals in absolute value forming means;
    (f) finding the differential with respect to time of said second set of different signals in differentiating means;
    (g) always varying one of the control inputs to the control system in steps at regular time intervals in the same direction until the sign of said differential with respect to time has changed from minus to plus using minimum value control means;
    (h) thereupon varying the same control input in steps in the opposite direction using said minimum value control means;
    (i) repeating said steps of varying in one direction and the other using said minimum value control means; and
    (j) varying the remaining control inputs using said minimum value control means in the same manner cyclicly and sequentially after a respective predetermined number of said sign reversals using said minimum value control means.

* * * * *